United States Patent
Yamada et al.

(10) Patent No.: US 9,253,112 B2
(45) Date of Patent: Feb. 2, 2016

(54) NETWORK NODE AND PACKET CONTROL METHOD

(71) Applicant: HITACHI, LTD., Tokyo (JP)

(72) Inventors: Masaki Yamada, Tokyo (JP); Yuji Ogata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 50 days.

(21) Appl. No.: 14/364,282

(22) PCT Filed: Dec. 20, 2012

(86) PCT No.: PCT/JP2012/083019
§ 371 (c)(1),
(2) Date: Jun. 10, 2014

(87) PCT Pub. No.: WO2013/094671
PCT Pub. Date: Jun. 27, 2013

(65) Prior Publication Data
US 2014/0341228 A1    Nov. 20, 2014

(30) Foreign Application Priority Data

Dec. 21, 2011    (JP) .................................. 2011-279828

(51) Int. Cl.
*H04L 12/28* (2006.01)
*H04L 12/865* (2013.01)
*H04L 29/06* (2006.01)
*H04J 3/06* (2006.01)

(52) U.S. Cl.
CPC .......... *H04L 47/6275* (2013.01); *H04J 3/0632* (2013.01); *H04L 65/605* (2013.01); *H04L 69/28* (2013.01)

(58) Field of Classification Search
USPC .................................. 370/401, 389, 392, 412
See application file for complete search history.

(56) References Cited

U.S. PATENT DOCUMENTS

| 5,301,193 A | 4/1994 | Toyofuku et al. |
| 6,157,946 A * | 12/2000 | Itakura ...................... G06F 3/14 709/217 |
| 6,389,031 B1 * | 5/2002 | Chao .................... H04L 12/5693 370/412 |
| 2002/0026310 A1 | 2/2002 | Mochida et al. |

(Continued)

FOREIGN PATENT DOCUMENTS

| JP | 04-179341 A | 6/1992 |
| JP | 2002-077233 A | 3/2002 |

(Continued)

OTHER PUBLICATIONS

Chung et al., Dynamic-CBT and ChIPS—Router Support for Improved Multimedia Performance on the Internet, Proceedings fo the eighth ACM international conference on Multimedia, 2000, pp. 239-248.

(Continued)

*Primary Examiner* — Duc C Ho
(74) *Attorney, Agent, or Firm* — Mattingly & Malur, PC

(57) ABSTRACT

To control a timing of transmitting real-time packets, it is provided a network node for transferring a packet, comprising: ports for inputting and outputting a packet to be transferred; a buffer memory for temporarily storing the input packet; a search engine for determining a port from which the input packet is output; and a timing adjusting unit for adjusting a difference in period of time needed from reception of a specific type of packet to transmission thereof.

7 Claims, 11 Drawing Sheets

(56) References Cited

U.S. PATENT DOCUMENTS

2007/0160052 A1* 7/2007 Okada .................. H04L 45/742 370/392
2008/0181112 A1 7/2008 Beck et al.

FOREIGN PATENT DOCUMENTS

| | | |
|---|---|---|
| JP | 2002-271388 A | 9/2002 |
| JP | 2005-142895 A | 6/2005 |
| JP | 2005-217760 A | 8/2005 |
| JP | 2007-134873 A | 5/2007 |
| JP | 2010-517470 A | 5/2010 |

OTHER PUBLICATIONS

Kamimura et al., "Low-Jitter Packet Scheduling Method for Broadcasting Signal Distribution on Residential Network", IEICE Technical Report NS2006-158~244 Network System, Mar. 1, 2007, vol. 106, pp. 1-6, No. 577.

International Search Report and Written Opinion received in International Application No. PCT/JP2012/083019, mailed Jan. 29, 2013.

* cited by examiner

| PACKET TYPE | INSERTION POSITION | VLAN ID | MAC ADDRESS | IP ADDRESS | TCP INBOUND PORT | TCP OUTBOUND PORT |
|---|---|---|---|---|---|---|
| JITTER REDUCTION TARGET A | 3 | | aa.aa.aa.aa.aa.aa | yy.yy.yy.yy | xx | xx |
| JITTER REDUCTION TARGET B | 5 | xx | | | yy | |
| JITTER REDUCTION TARGET C | 10 | yy | | | zz | |
| JITTER REDUCTION TARGET D | 8 | zz | | | | |
| JITTER REDUCTION TARGET E | 7 | | bb.bb.bb.bb.bb.bb | zz.zz.zz.zz | | ww |

Fig. 4

| PACKET TYPE | INSERTION POSITION | MOVABLE OR NOT | STORED QUANTITY | ACCEPTED QUANTITY | IP ADDRESS | TCP INBOUND PORT | TCP OUTBOUND PORT |
|---|---|---|---|---|---|---|---|
| TIME SYNCHRONOUS PACKET A | 8 | NOT MOVABLE | 2 | 2 | | xx | xx |
| TIME SYNCHRONOUS PACKET B | 10 | MOVABLE | 0 | 3 | xx.xx.xx.xx | xx | xx |
| JITTER REDUCTION TARGET A | 5 | MOVABLE | | | vv.vv.vv.vv | yy | |

Fig. 6

| PACKET TYPE | INSERTION POSITION | PRIORITY | IP ADDRESS | IP MASK | TCP INBOUND PORT | TCP OUTBOUND PORT |
|---|---|---|---|---|---|---|
| TIME SYNCHRONOUS PACKET | 3 | 1 | | | xx | xx |
| JITTER REDUCTION TARGET A | 5 | 3 | xx.xx.xx.xx | yy.yy.yy.yy | xx | xx |
| JITTER REDUCTION TARGET B | 7 | 2 | | | yy | |

Fig. 10

NETWORK NODE AND PACKET CONTROL METHOD

INCORPORATE BY REFERENCE

The present application claims priority from Japanese patent application JP 2011-279828 filed on Dec. 21, 2011, the content of which is hereby incorporated by reference into this application.

BACKGROUND OF THE INVENTION

This invention relates to a network node, and more particularly, to a technology of controlling a transmission timing for a packet to be transferred.

The recent broadening, speed-up, and cost reduction of communication networks expand the fields to which the network technology is applied. This increases demands for achieving more reliable communication.

While there are many factors in the communication reliability, one of the reliabilities in communication of best effort type such as the existing Ethernet (trademark) that are difficult to achieve is to guarantee packet inter-arrival interval jitter. In a network node, a buffer is provided with a queue that stores packets to be received from a plurality of lines, and packets to be transferred are processed in order. Accordingly, the processing time needed at a network node varies depending on the existence/absence of traffic, i.e., the difference in number of packets stored in a queue. The time delay caused by the time period during which packets are stored in the queue of a network node in this way is the queuing delay.

One method of improving the communication reliability is to suppress generation of jitters caused by a variation in queuing delay in a transmission path. For example, suppressing delay-originated jitters brings about an effect of improving the quality of real-time communication, such as voice calling and video streaming, an effect of reducing the capacity of the buffer in a terminal, and other such effects.

JP 2002-271388 A discloses a technology designed to achieve such effects. Specifically, according to the technology disclosed in JP 2002-271388 A, an apparatus on the transmission side adds time information on a reproduction timing to a real-time packet, and an apparatus on the reception side refers to the time information to adjust the timing for a buffered packet and transmits the packet to a terminal. This enables a terminal-side gateway to remove the influence of the queuing delay caused in the transmission path for the real-time packet.

To improve the accuracy in the time synchronization method over a network, it is important to reduce jitters. As the time synchronization method over a network, the Network Time Protocol (NTP) or the like has hitherto been used. In recent years, on the other hand, the smart grid, the base station network for cellular phones, and the like tend to employ IEEE 1588 v2 (PTP: Precision Time Protocol) as a method that enables more accurate time synchronization in a wider area.

In the IEEE 1588 v2, in order to increase the accuracy of time synchronization, an error in the synchronous time caused by the difference in delay time on a transmission path on a network is reduced. Building a network that uses the IEEE 1588 v2, on the other hand, needs a network node that has the function of Boundary Clock or Transparent Clock.

The Boundary Clock has a clock for synchronization inside a network node, and synchronizes the time with a host apparatus by using a synchronous packet received from the host apparatus. Further, the Boundary Clock synchronized with a host apparatus transmits a synchronous packet to a subordinate apparatus to synchronize the clock of the subordinate apparatus.

The Transparent Clock causes a network node to measure the time required for a synchronous packet to pass through the Transparent Clock, and to add a compensation for the time to the synchronous packet. As a result, both apparatus synchronized with each other can ignore the difference in delay time for each packet passing the Transparent Clock.

With such a method, synchronization achieved by the IEEE 1588 v2 secures high time synchronization accuracy. On the other hand, a network node compatible with the Boundary Clock or Transparent Clock is needed to build a network, and hence it is not possible to effectively use the conventional network resources built with the Ethernet or the like. Moreover, the complicated functions of the Boundary Clock and Transparent Clock lead to cost increase and size increase.

In this respect, as a related art, JP 2007-134873 A discloses a technology for improving the synchronization accuracy through the arithmetic operations in an apparatus that receives synchronous packets. In the technology disclosed in JP 2007-134873 A, even when a node constructing a network does not have the functions of the Boundary Clock and Transparent Clock, the synchronization accuracy is secured through arithmetic operations at a terminal node to be synchronized. With the use of transmission of time synchronous packets at a given interval, a terminal node monitors the arrival intervals of time synchronous packets to measure a queue-originated jitter, and correct the synchronous time or estimate the degree of congestion of a network.

SUMMARY OF THE INVENTION

In JP 2002-271388 A, the terminal-side gateway buffers a real-time packet to be transferred, and hence the timing at which a packet arrives at a terminal can be controlled even when packets are transmitted via a wide area network or the like using the related-art best effort connection. However, this method requires the time to be synchronized between a transmitter server and a terminal-side gateway that performs buffering. Therefore, the terminal-side gateway needs a large-capacity buffer to store real-time packets and needs a function of transferring packets at a specific time, thereby undesirably complicating the configuration of the apparatus and increasing the cost.

The representative one of inventions disclosed in this application is outlined as follows. There is provided a network node for transferring a packet, comprising: ports for inputting and outputting a packet to be transferred; a buffer memory for temporarily storing the input packet; a search engine for determining a port from which the input packet is output; and a timing adjusting unit for adjusting a difference in period of time needed from reception of a specific type of packet to transmission thereof.

According to a typical embodiment of this invention, the timing of transmitting real-time packets can be controlled.

BRIEF DESCRIPTION OF THE DRAWINGS

FIG. 4 is an explanatory diagram illustrating an example of a packet discrimination table according to the first embodiment of this invention.

FIG. 6 is an explanatory diagram illustrating an example of a packet discrimination table according to the second embodiment of this invention.

FIG. 10 is an explanatory diagram illustrating an example of a packet discrimination table according to the third embodiment of this invention.

DETAILED DESCRIPTION OF THE PREFERRED EMBODIMENTS

First Embodiment

Figure 1:
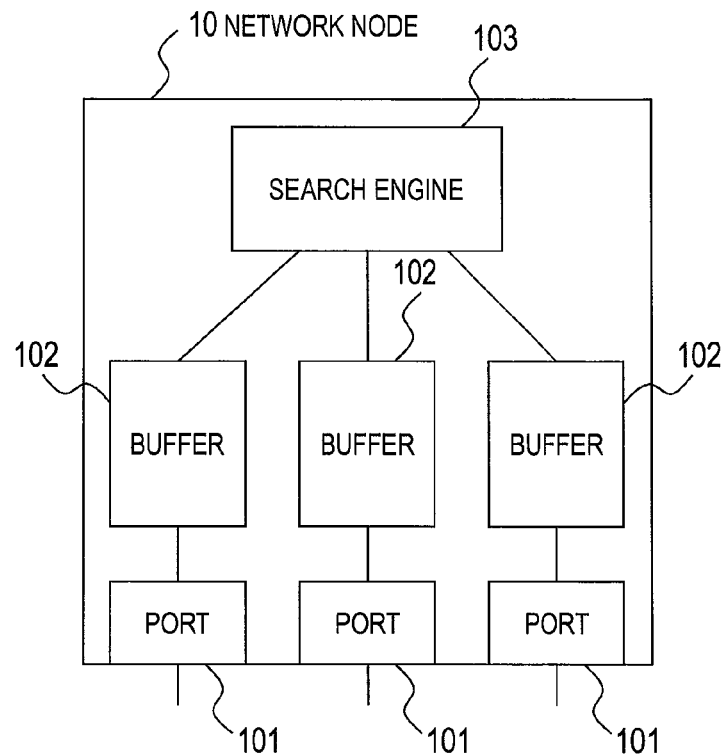
FIG. 1 is a block diagram illustrating a configuration of a network node according to a first embodiment of this invention.

FIG. 1 is a block diagram illustrating the configuration of a network node 10 according to a first embodiment of this invention.

The network node 10 of this embodiment includes a plurality of ports 101, a plurality of buffers 102, and a search engine 103. The network node 10 is connected to a network via the ports 101. The ports 101 transfer received network packets to the respective buffers 102.

The buffer 102 transfers a packet to the search engine 103 after storing the packet temporarily. The search engine 103 determines the port 101 where the packet is to be output, and transfers the packet to the determined port 101 via the associated buffer 102. The port 101 determined by the search engine 103 outputs the packet to the network.

Figure 2:
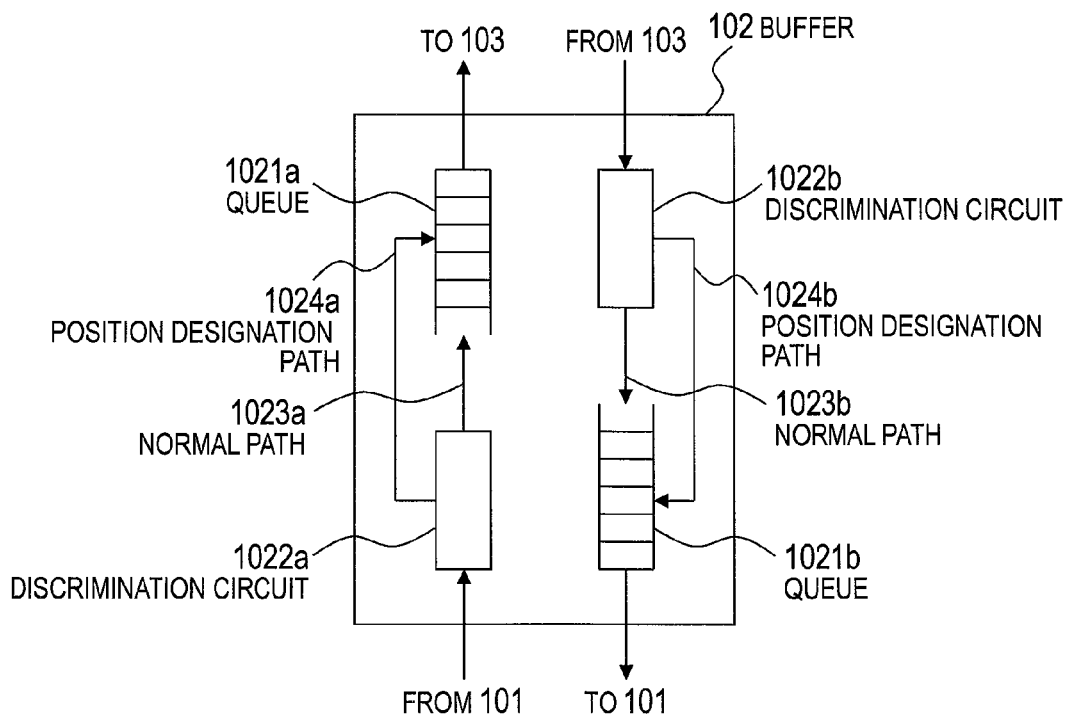
FIG. 2 is a block diagram illustrating a configuration of the buffer according to the first embodiment of this invention.

FIG. 2 is a block diagram illustrating the configuration of the buffer 102.

The buffer 102 includes queues 1021a and 1021b and discrimination circuits 1022a and 1022b. The buffer 102 is provided with normal paths 1023a and 1023b for respectively transmitting packets from the discrimination circuits 1022a and 1022b to the queues 1021a and 1021b, and position designation paths 1024a and 1024b for respectively transmitting packets to suppress jitters from the discrimination circuits 1022a and 1022b to the queues 1021a and 1021b. The packets transmitted through the position designation paths 1024a and 1024b are stored at designated positions in the queues 1021a and 1021b.

When the buffer 102 receives a packet from the port 101, the discrimination circuit 1022a discriminates whether the received packet is a jitter-reduction target packet for suppressing jitters. When the received packet is not a jitter-reduction target packet, the discrimination circuit 1022a transmits the received packet to the queue 1021a through the normal path 1023a. When the received packet is a jitter-reduction target packet, on the other hand, the discrimination circuit 1022a transmits the received packet to the queue 1021a through the position designation path 1024a. At the time of the packet transmission, the discrimination circuit 1022a adds a flag indicating that the packet is a jitter-reduction target packet to the received packet, and performs specific position queuing to store the packet at a storage position in the queue 1021a obtained from the result of search.

When the queue 1021a stores packets, the queue 1021a transmits the packets to the search engine 103 in order from the top at every given period of time or in response to a request from the search engine 103. In this case, even when there is a free area in the queue and a packet is stored in an area located after the free area, the queue is controlled to move forward one at a time.

For example, a time wait needed to process a single packet may be inserted. Further, reading of packets from the queue 1021a may be controlled in a predetermined machine cycle. Still further, a dummy packet may be stored in a free area.

When a packet is transmitted to the buffer 102 from the search engine 103, by the same processing as that performed when a packet is received from the port, the discrimination circuit 1022b discriminates whether the received packet is a jitter-reduction target packet, and transmits the packet to the queue 1021b by using one of the normal path 1023b and the position designation path 1024b in accordance with the result of the discrimination. The queue 1021b transmits the packets to the port 101 in order from the top.

Figure 3:
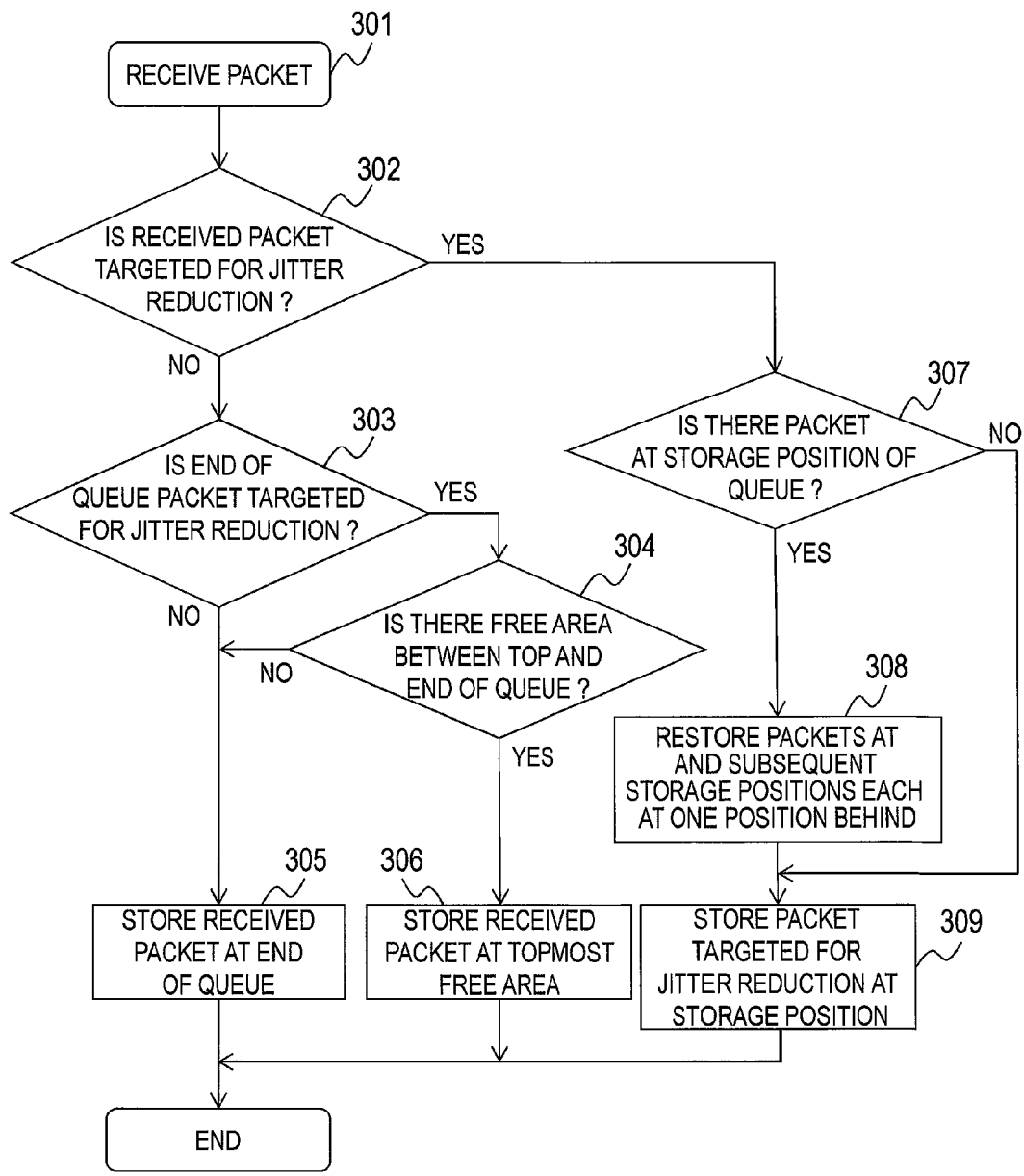
FIG. 3 is a flowchart of processing for discriminating a storage position of a packet according to the first embodiment of this invention.

FIG. 3 is a flowchart of the processing in which the buffer 102 discriminates the storage position of a packet into the queue 1021a. Although processing of a received packet in the queue 1021a and the discrimination circuit 1022a is described, similar processing of a transmitted packet is performed in the queue 1021b and the discrimination circuit 1022b.

When the network node 10 receives a packet (301), first, the discrimination circuit 1022a searches a packet discrimination table shown in FIG. 4 by using at least one of a MAC address 404, an IP address 405, a TCP inbound port number 406, and a TCP outbound port number 407 as a search condition, and discriminates whether the received packet is a jitter-reduction target packet. When the received packet is a jitter-reduction target packet, an insertion position 402 for the packet is acquired from the packet discrimination table (302).

When the result of the discrimination shows that the received packet is not a jitter-reduction target packet, the discrimination circuit 1022a transmits the packet to the queue 1021a through the normal path 1023a.

The queue 1021a discriminates based on a flag added to the packet whether the packet at the end of queue is a jitter-reduction target packet (303). When the packet at the end of queue is not a jitter-reduction target packet, the received packet is stored at the end of the queue 1021a (305). When the packet at the end of queue is a jitter-reduction target packet (304), on the other hand, search for a free area is performed from the top of queue. When there is not any free area, the received packet is stored at the end of the queue 1021a (305). When there is a free area, on the other hand, the received packet is stored in the topmost free area (306).

When the result of the discrimination in Step 302 shows that the received packet is a jitter-reduction target packet, the discrimination circuit 1022a adds a flag indicating that the received packet is a jitter-reduction target packet to the received packet, and transmits the packet to the queue 1021a through the position designation path 1024*a*. At this time, information on the packet insertion position acquired from the packet discrimination table shown in FIG. 4 is added to the packet. In this case, even when there are few packets stored in a queue and there is a free area located ahead of the insertion position in the queue, the received packet is stored at the expected insertion position without performing forward shifting. Even in reading processing, forward shifting is not performed, and a free area in the queue is shifted forward over the same time as needed to process a single packet.

The queue 1021*a* discriminates whether the packet is stored at the insertion position (nth) of the jitter-reduction target packet discriminated by the discrimination circuit 1022*a* (307). As a result of the discrimination, when the packet is stored in the nth area in the queue, packets stored in the nth and subsequent areas are shifted backward one by one (308), and the received packet is stored in the discriminated insertion position (309).

However, when a packet stored in the (n+1)th or subsequent area in the queue 1021*a* is a jitter-reduction target packet, other packets are shifted backward without changing the storage position of the packet. Specifically, in the case of n<m, when the jitter-reduction target packet is stored in the mth area while a normal packet (packet other than the jitter-reduction target packet) is stored in the (m−1)th area, the normal packet stored in the (m−1)th area is stored in the (m+1)th area so as not to change the position of the jitter-reduction target packet.

When the jitter-reduction target packet is stored in the nth area, the jitter-reduction target packet stored in the nth area is first stored in the (n+1)th area, and a following packet carries down the order of packets other than the jitter-reduction target packet by the same policy. Then, the jitter-reduction target packet is stored at the insertion position (nth area in the queue).

According to this embodiment, the insertion position of the jitter-reduction target packet with a high priority is set ahead in principle. Accordingly, the insertion position of a jitter-reduction target packet newly stored is set ahead (priority is given) when the jitter-reduction target packet is already stored in the storage position at the time the new jitter-reduction target packet is stored, and hence packets already stored are shifted backward. An example of controlling this shifting based on a parameter is described later in a fourth embodiment of this invention.

FIG. 4 is an explanatory diagram of an example of the packet discrimination table used for the discrimination circuit 1022 of the buffer 102 to discriminate a jitter-reduction target packet.

The packet discrimination table includes information on a packet type 401, an insertion position 402, a VLAN ID 403, a MAC address 404, an IP address 405, a TCP inbound port 406, and a TCP outbound port 407. It should be noted that this packet discrimination table may include an IP mask or the like similarly to packet discrimination tables in other embodiments of this invention.

The discrimination circuit 1022*a* compares information in the header of a received packet with the MAC address 404, the IP address 405, the TCP inbound port 406, the TCP outbound port 407, and the like described in the table. When a matching address or port is registered, the discrimination circuit 1022*a* discriminates that the packet is a jitter-reduction target packet, and acquires information on the insertion position 402 of the jitter-reduction target packet. As header information for packet identification, information in 5-tuple of the header of the packet may be used, or the hash value in this information may be used, in which case those pieces of information are stored in the packet discrimination table.

The packet discrimination table that is used by the discrimination circuit 1022*a* for discriminating a packet directed to the search engine 103 may differ from the packet discrimination table that is used by the discrimination circuit 1022*b* for discriminating a packet directed to the port 101. In this case, information on the insertion position 402 included in one packet discrimination table differs from that included in the other packet discrimination table.

A network node is processed in pipeline within the search engine, and hence the time needed for packet search does not depend on a packet (for example, packet size). For this reason, the storage position into a queue substantially determines the time needed to pass a network node.

According to this embodiment, with reference to a clock within a network node, the pass time can be controlled at high accuracy by transmitting a packet to the search engine from a queue in a given period. The transmission period needs to be set to a longest time for the processing in accordance with a change in processing time of the search engine based on the type of a packet or the search condition therefor. In this case, the performance may be deteriorated a little.

On the other hand, when the search engine transmits a signal that permits transmission of a packet from a queue to the search engine, and a packet is transmitted to the search engine from the queue based on this signal, a jitter corresponding to the difference between the processing times of the search engine occurs, but degradation of the performance becomes smaller.

However, a general search engine performs processing in pipeline as described above, and hence the queuing time for receiving a packet is mostly the time for accessing a memory. For this reason, the difference in queuing time originating from the difference in the type of a packet or the contents of processing is small, and it seems that degradation of the performance and an increase in jitter are restrictive in any one of the above-mentioned methods. Degradation of the performance and an increase in jitter can also be balanced by using two methods in combination: a method of executing the control of the transmission period from a queue to the search engine in response to a transmission request from the search engine, and a method of executing the control after a predetermined minimum queuing time even in a transmittable state.

In the related-art QoS control, a packet that needs to be controlled by priority is processed early. In this embodiment, however, the insertion position of a jitter-reduction target packet is made selectable. The reason is to fulfill both QoS control and a process which is different from the QoS control and for which a small amount of delay is desirable by performing the process on a jitter-reduction target packet for which fewer jitters are desirable. Specifically, in the related-art QoS control, the effect of reducing jitters is brought about by transferring a jitter-reduction target packet by highest priority.

However, when there are many packets that need to be transmitted by priority, priority packets conflict one another, thus decreasing the effect of reducing jitters. Further, it is difficult to carry out control of the priority between jitter-reduction target packets, selection of the contents of processing in accordance with the difference in accuracy demanded, and the like.

For this reason, this embodiment uses specific position queuing for storing a packet at the specific position in a queue so that QoS control and jitter reduction can both be fulfilled by processing a priority control packet by priority and processing a jitter-reduction target packet over a given period of time. An example of using both specific position queuing and the related-art QoS control is described later in a third embodiment of this invention.

The network node of this embodiment can contribute to reduction in jitters on the entire path, without synchronization of time with the network node or the like that is the sender of a packet. Particularly, the network node of this embodiment is alone effective, without cooperating with other nodes, so that even when other nodes on a path are not compatible with time synchronization, jitters can be reduced.

Further, when each network node reduces jitters, the cumulative increase in jitter components originating from the expansion of the scale of a network can be suppressed, and hence effective time synchronization can be ensured over a large scale network.

Examples of a jitter-reduction target packet that is targeted by the network node of this embodiment include a voice-call packet and a packet for video delivery service. This can improve the quality of services that need real time transmission, and reduce the capacity of the buffer provided in each apparatus.

Other examples of the jitter-reduction target packet include a signal for time synchronization and a control signal for a mechanical apparatus. It is desired that those signals arrive with fewer jitters (in other words, accurately at an expected timing). Hitherto, a dedicated line is used, communication timing is secured by time-sharing a line, or transfer is carried out by highest priority under QoS control, thereby reducing the delay itself.

However, the dedicated line needs a line for each specific application, thus increasing the line cost. When a line is controlled by time sharing, the band of the line is not used effectively, thus requiring a dedicated apparatus that manages time sharing control, leading to a high cost. The control by highest priority under QoS control, which does not increase the cost itself, may be affected by the amount of traffic, thus causing packets that need to be transferred by priority to conflict one another. This may degrade the overall quality.

A narrow area network is feasible at low cost. In a case of a wide area network that includes a large number of router switches and is shared by other many packets that are not intended for synchronization, the influence of jitters becomes significant. Accordingly, with expansion of the scale of a network, jitter components may become dominant, thus deteriorating synchronization.

On the other hand, according to this embodiment, a jitter-reduction target packet is not transferred by priority, but is transferred over a certain period of time. Reducing an error in the certain period of time stabilizes the time required for a packet to pass the entire network.

In addition, this embodiment can be implemented by a slight improvement on the buffer management software or the like for a network node, and hence this embodiment with a slight improvement can demonstrate the effects, and can easily be applied to the related-art network node at low cost.

Second Embodiment

Next, a second embodiment of this invention is described. The second embodiment makes good use of the characteristics of the time synchronous packet. The fundamental configuration of a network node of the second embodiment is the same as that of the above-mentioned first embodiment, and hence its description is omitted. A time synchronous packet is a kind of a jitter-reduction target packet.

Figure 5:
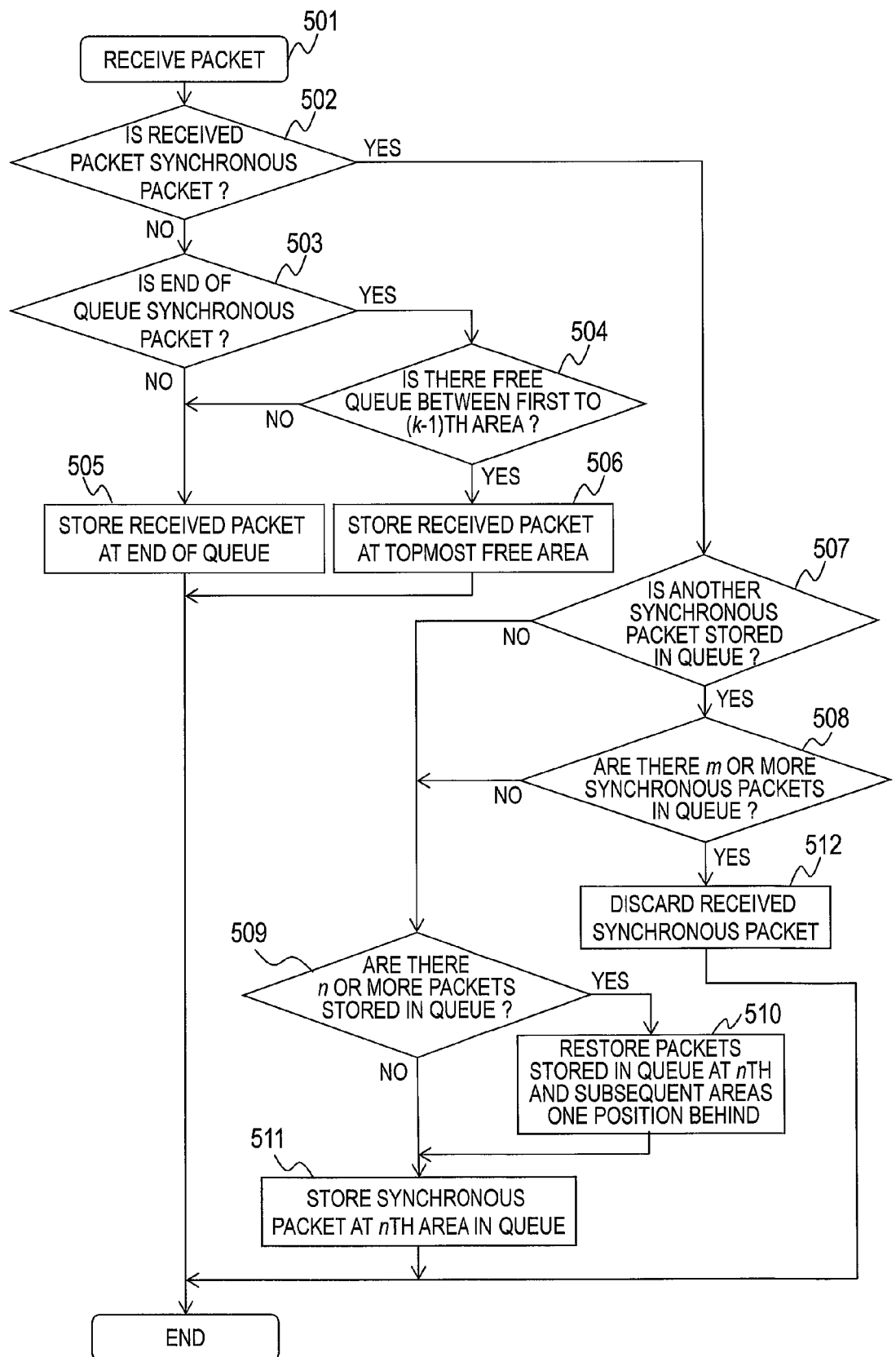
FIG. 5 is a flowchart of processing for discriminating a storage position of a packet according to a second embodiment of this invention.

FIG. 5 is a flowchart of the processing in which the buffer 102 according to the second embodiment discriminates the storage position of a packet into the queue 1021a. Although processing of a received packet in the queue 1021a and the discrimination circuit 1022a is described, similar processing of a transmitted packet is performed in the queue 1021b and the discrimination circuit 1022b.

When the network node 10 receives a packet (501), first, the discrimination circuit 1022a searches a packet discrimination table shown in FIG. 6 by using at least one of an IP address 606, a TCP inbound port number 607, and a TCP outbound port number 608 as a search condition, and discriminates whether the received packet is a synchronous packet. When the received packet is a synchronous packet, an insertion position 602 for the packet is acquired from the packet discrimination table (502).

When the result of the discrimination shows that the received packet is not a synchronous packet, the discrimination circuit 1022a transmits the packet to the queue 1021a through the normal path 1023a.

The queue 1021a discriminates based on a flag added to the packet whether the packet at the end of queue is a synchronous packet (503). When the packet at the end of queue is not a synchronous packet, the received packet is stored at the end of the queue 1021a (505). When the packet at the end of queue is a synchronous packet, on the other hand, search for a free area is performed from the top of queue to the (k−1)th area (k is the position at the end of queue) (504). When there is not any free area, the received packet is stored at the end of the queue 1021a (505). When there is a free area, on the other hand, the received packet is stored in the topmost free area (506).

When the result of the determination in Step 502 shows that the received packet is a synchronous packet, the discrimination circuit 1022a discriminates whether a plurality of synchronous packets of the same type are stored in the queue 1021a by referring to a stored quantity 604 and an accepted quantity 605 in the packet discrimination table shown in FIG. 6 (507). When the synchronous packets of the same type are already stored in the queue 1021a, the accepted quantity (m) of the synchronous packets of this type is compared with the stored quantity (508). When the stored quantity has reached the maximum, the received synchronous packet is discarded (512).

When the stored quantity 604 is less than the accepted quantity 605, on the other hand, the queue 1021a discriminates whether the packets stored in the queue are larger in number than an nth value at the storage position (509). When the quantity of packets stored in the queue is larger than n, packets at the nth and subsequent areas are restored one position behind (510). At this time, the positions of other synchronous packets stored in the queue are maintained, and the positions of packets other than the synchronous packets are shifted backward. When the nth packet is a synchronous packet, information on the movable/unmovable field 603 is referred to. When this packet is not movable, the insertion position of a packet to be newly inserted is shifted backward by one position. When this packet is movable, the insertion position of the packet is shifted backward.

Then, the discrimination circuit 1022a adds a flag indicating that the received packet is a jitter-reduction target packet to the received packet, transmits information on the insertion position 602 and the movable/unmovable field 603, and the packet to the queue 1021a through the position designation path 1024a, stores the information and the packet in the nth area in the queue, and increments the value of the stored quantity 604 of the packets of this type by "1" (511).

When the packet is stored, the queue 1021a transmits the packets to the search engine 103 one by one in order from the packet stored at the top at every given period of time or in response to a request from the search engine 103 and the port 101. The queue 1021a notifies the discrimination circuit 1022a of the transmission of the time synchronous packet, and decrements the value of the stored quantity 604 of the packets in the packet discrimination table shown in FIG. 6 by "1". With this, the quantity of time synchronous packets stored in the queue can be grasped.

FIG. 6 is an explanatory diagram of an example of a packet discrimination table used for the discrimination circuit 1022 of the buffer 102 to discriminate a jitter-reduction target packet.

The packet discrimination table includes information on a packet type 601, an insertion position 602, a movable/unmovable field 603, a stored quantity 604, an accepted quantity 605, an IP address 606, a TCP inbound port 607, and a TCP outbound port 608. It should be noted that this packet discrimination table may include a VLAN ID, a MAC address, an IP mask, or the like similarly to packet discrimination tables in other embodiments of this invention.

The IP address 606, the TCP inbound port number 607, and the TCP outbound port number 608 are used by the discrimination circuit 1022 to discriminate whether the received packet is a jitter-reduction target packet.

As described above, in the second embodiment, attention is paid to a time synchronous packet among jitter-reduction target packets. Specifically, in the second embodiment, when a plurality of time synchronous packets exist on a network, the insertion position of a packet and whether the packet is movable or not are determined based on destination information or the like of each time synchronous packet.

Usually, the transfer period of a time synchronous packet is a constant interval. However, when a large number of requests and resending events occur due to a poor communication state or an increase in delay, many time synchronous packets may be generated in a short period of time. When there are many time synchronous packets of the same type, those time synchronous packets are not required in a short period of time and have low importance from the viewpoint of time synchronization. When many time synchronous packets of the same type are stored in a certain period of time, the throughput of other network traffics may be deteriorated. In this respect, the upper limit of time synchronous packets that are allowed to be stored in a queue is determined, and the stored quantity is monitored to thin out time synchronous packets.

The second embodiment can reduce the influence of a time synchronous packet on the throughput of other network traffics.

Third Embodiment

Next, a third embodiment of this invention is described. The third embodiment uses both specific position queuing and related-art QoS control to fulfill both the QoS control and jitter reduction.

Figure 7:
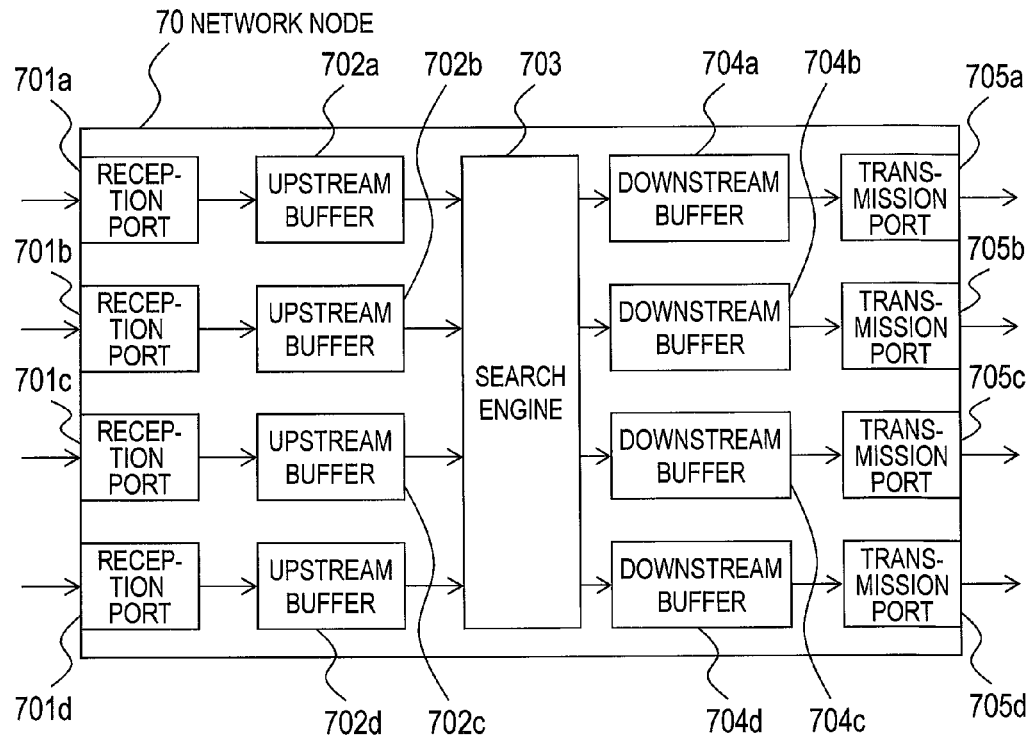
FIG. 7 is a block diagram illustrating a configuration of a network node according to a third embodiment of this invention.

FIG. 7 is a block diagram illustrating the configuration of a network node according to the third embodiment.

A network node 70 according to the third embodiment includes reception ports 701a to 701d, upstream buffers 702a to 702d, a search engine 703, downstream buffers 704a to 704d, and transmission ports 705a to 705d.

The reception ports 701a to 701d receive packets over a network. The upstream buffers 702a to 702d store the packets that are received by the reception ports 701a to 701d. The downstream buffers 704a to 704d store the packets that are output from the search engine 703. The transmission ports 705a to 705d transmit the packets stored in the downstream buffers 704a to 704d to the network.

The reception ports 701a to 701d and the transmission ports 705a to 705d may be constructed by a network interface card or the like, and a reception port and a transmission port may be physically provided in a single interface. Further, a reception port and a transmission port may be a single port physically.

Figure 8:
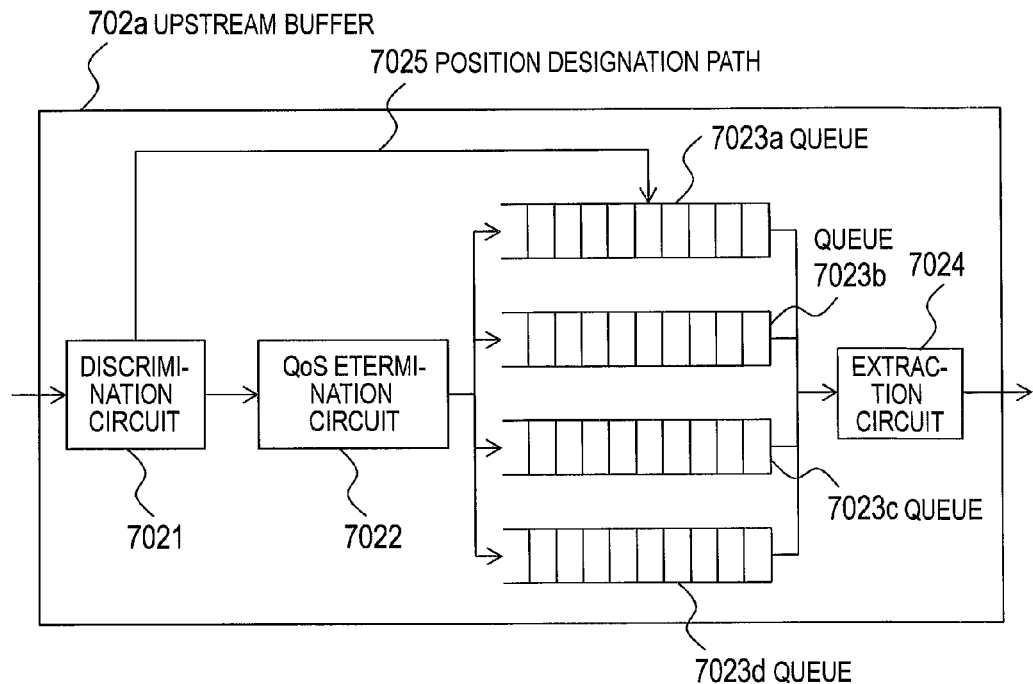
FIG. 8 is a block diagram illustrating a configuration of an upstream buffer according to the third embodiment of this invention.

FIG. 8 is a block diagram illustrating the configuration of the upstream buffer 702a. Although the configuration of the upstream buffer 702a is illustrated in FIG. 8, the other upstream buffers 702b to 702d have the same configuration.

The upstream buffer 702a includes a discrimination circuit 7021, a QoS determination circuit 7022, queues 7023a to 7023d, and an extraction circuit 7024, with a position designation path 7025 provided between the discrimination circuit 7021 and the queue 7023a.

The discrimination circuit 7021 discriminates the type of the input packet. The QoS determination circuit 7022 determines the QoS of the input packet. Each of the queues 7023a to 7023d stores the input packet temporarily.

The extraction circuit 7024 extracts packets from the queues 7023a to 7023d.

The queues exemplified in FIG. 8 are classified in four levels in accordance with the priorities of packets to be stored in the queue: queue 7023a of the highest priority, queue 7023b of the second priority, queue 7023c of the third priority, and queue 7023d of the fourth priority. The packet that has undergone QoS processing is stored in any of the queues in accordance with the result of QoS processing, and its location in the queue is selected.

Figure 9:
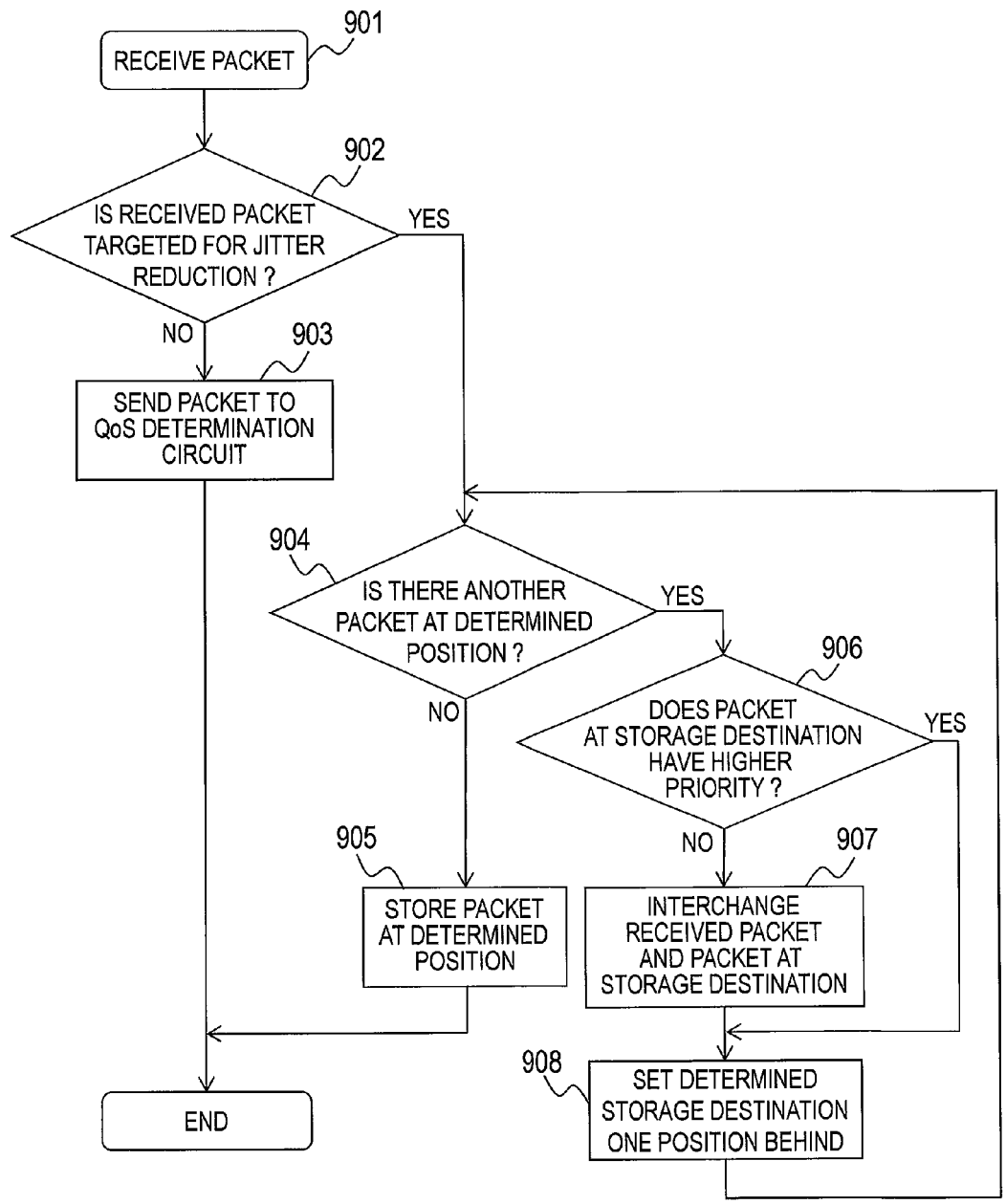
FIG. 9 is a flowchart of processing for discriminating a storage position of a packet according to the third embodiment of this invention.

FIG. 9 is a flowchart of the processing in which the upstream buffer discriminates the storage position of a packet into the queue.

When the network node 70 receives a packet (901), first, the discrimination circuit 7021 of the upstream buffer 702a searches a packet discrimination table shown in FIG. 10 by using at least one of an IP address 1004, an IP mask 1005, a TCP inbound port number 1006, and a TCP outbound port number 1007 as a search condition, and discriminates whether the received packet is a jitter-reduction target packet (for example, time synchronous packet). When the received packet is a synchronous packet, an insertion position 1002 and a priority 1003 for the packet are acquired from the packet discrimination table (902).

When the result of the discrimination shows that the received packet is not a jitter-reduction target packet, the discrimination circuit 7021 transmits the received packet to the QoS determination circuit 7022 (903).

When the received packet is a jitter-reduction target packet, on the other hand, the discrimination circuit 7021 adds a flag indicating that the packet is a jitter-reduction target packet to the received packet, and transmits the jitter-reduction target packet together with information on the insertion position and the priority to the queue 7023a of the highest priority through the position designation path 7025.

The queue 7023a discriminates whether another packet is stored at the insertion position of the jitter-reduction target packet (904). As a result of the discrimination, when a packet is not stored at the insertion position of the jitter-reduction target packet, information indicating that the packet is a jitter-reduction target packet (for example, flag) is added, and the information on the priority of the packet and the packet are stored at the insertion position (905).

When a packet is stored at the insertion position of the jitter-reduction target packet, on the other hand, the priority of the received packet is compared with the priority of the packet stored at the insertion position (906). When the priority of the received packet is lower, the packet stored at the insertion position is interchanged with the received packet (907).

Then, the insertion position of the jitter-reduction target packet is shifted backward by one position (908), and the processing returns to Step 905 to repeat the discrimination of the insertion position of a packet.

In this manner, the priorities of packets are compared to shift the storage position and insertion position of a packet backward, and hence the storage position of a priority packet is not easily changed, thus ensuring the priority.

In this case, even when there are few packets stored in a queue and there is a free area located ahead of the insertion position in the queue, the received packet is stored at the expected insertion position without performing forward shifting. Even in reading processing, forward shifting is not performed, and a free area in the queue is shifted forward over the same time as needed to process a single packet.

The extraction circuit 7024 reads the packets stored in the queues 7023*a* to 7023*d* at a predetermined timing (for example, certain time period), and transmits the packets to the search engine 703.

When a packet is stored in the queue 7023*a* of the highest priority, the extraction circuit 7024 extracts the packet from the highest-priority queue 7023*a* by priority over other queues. When a jitter-reduction target packet is stored in the priority queue 7023*a*, the extraction circuit 7024 may extract the packet from the highest-priority queue 7023*a* by priority over other queues. In addition, the extraction circuit 7024 may extract a packet from each of the queues 7023*a* to 7023*d* by a predetermined ratio (for example, a priority queue having a higher ratio).

FIG. 10 is an explanatory diagram of an example of the packet discrimination table used for the discrimination circuit 7021 of the upstream buffer 702*a* to discriminate a jitter-reduction target packet.

The packet discrimination table includes information on a packet type 1001, an insertion position 1002, a priority 1003, an IP address 1004, an IP mask 1005, a TCP inbound port 1006, and a TCP outbound port 1007. It should be noted that this packet discrimination table may include a VLAN ID, a MAC address, or the like similarly to packet discrimination tables in other embodiments of this invention.

The IP address 1004, the IP mask 1005, the TCP inbound port number 1006, and the TCP outbound port number 1007 are used by the discrimination circuit 7021 to discriminate whether the received packet is a jitter-reduction target packet.

The downstream buffers 704*a* to 704*d* may have the same configuration as the upstream buffer 702*a*, but the downstream buffers 704*a* to 704*d* may be configured to have only the queue 7023 and the extraction circuit 7024 if the search engine 703 is provided with the functions of the discrimination circuit 7021 and the QoS determination circuit 7022.

The queuing time may be influenced by the packet length on the transmission-port side, and hence transmission processing aware of the packet length may be performed. Specifically, at the time of storing a packet in a queue, the packet length or the packet transmission time that is calculated based on the packet length is stored, and the optimal transmission position is discriminated by adding the stored packet length or packet transmission time from the top. Such a method allows the transmission timing for a more highly precise jitter-reduction target packet (for example, time synchronous packet) to be managed on the transmission-port side. This method increases the complexity a little, and hence it is desired to select an adequate method from among the methods described above.

According to the third embodiment, a jitter-reduction target packet is stored in a queue in the path that ensures highest priority transfer among a plurality of queues 7023 of different priorities by using a position designation path. When a packet is stored in the highest-priority queue 7023*a*, the extraction circuit 7024 operates by the policy of always extracting a packet from the highest-priority queue first.

Depending on the result of the determination in the QoS determination circuit 7022, it is possible to select whether to store only a jitter-reduction target packet in the highest-priority queue 7023*a* or share a jitter-reduction target packet and a normal packet by the highest-priority queue 7023*a* in accordance with the operation policy.

The information on the priority of a packet to be stored in a queue is a discrimination condition for determining the insertion position of a packet, and hence this information may be a parameter dedicated for the jitter-reduction target packet, but may be used together with the priority that is given to a normal priority packet.

As described above, according to the third embodiment of this invention, even a router that has a plurality of queues for performing QoS priority control can fulfill QoS control and jitter reduction by adjusting the insertion position of a jitter-reduction target packet. Particularly, jitters may be reduced while lessening the influence on other priority traffics by setting behind the insertion position of a jitter-reduction target packet, which need not shorten the response time, and increasing the priority.

Fourth Embodiment

Next, a fourth embodiment of this invention is described. The fourth embodiment controls the movements of other packets involving insertion of a jitter-reduction target packet to reduce jitters.

Figure 11:
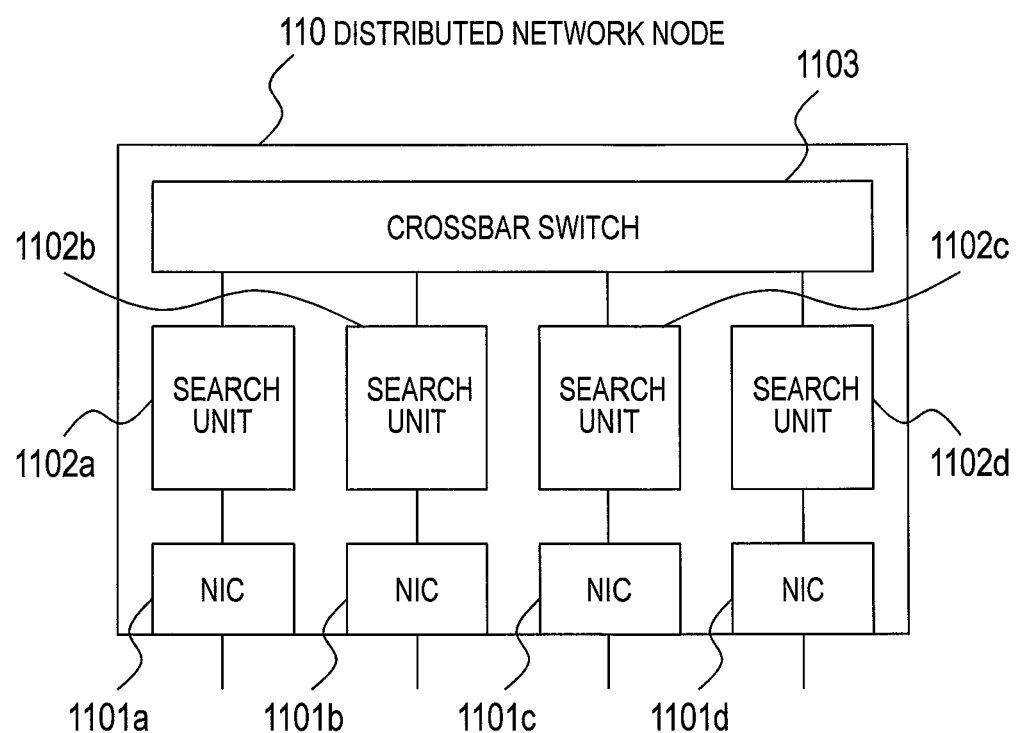
FIG. 11 is a block diagram illustrating a configuration of a network node according to a fourth embodiment of this invention.

FIG. 11 is a block diagram illustrating the configuration of a network node according to the fourth embodiment.

A distributed network node 110 according to the fourth embodiment includes a plurality of network interface cards (NICs) 1101*a* to 1101*d*, a plurality of search units 1102*a* to 1102*d*, and a crossbar switch 1103. The crossbar switch 1103 connects the search units 1102*a* to 1102*d* to one another.

Although the network node illustrated in FIG. 11 has one NIC assigned to one search unit, a plurality of NICs may be assigned to one search unit, and one NIC may have a plurality of ports.

The NIC 1101*a* transmits the received packet to the search unit 1102*a*. The search unit 1102*a* searches a routing table (not shown), and determines the output port for the received packet.

For example, if the transfer destination of the packet searched by the search unit 1102*a* is connected to the NIC 1101*b*, the received packet is transmitted to the search unit 1102*b* via the crossbar switch 1103. The search unit 1102*b* searches the routing table again for the destination of the transmitted packet to determine the transfer destination, and then transmits a packet to the determined NIC 1101*b*. The search by the search unit 1102*a* at the time of inputting a packet is inbound search, and the search by the search unit 1102*b* via the crossbar switch 1103 before outputting a packet is outbound search.

Figure 12:
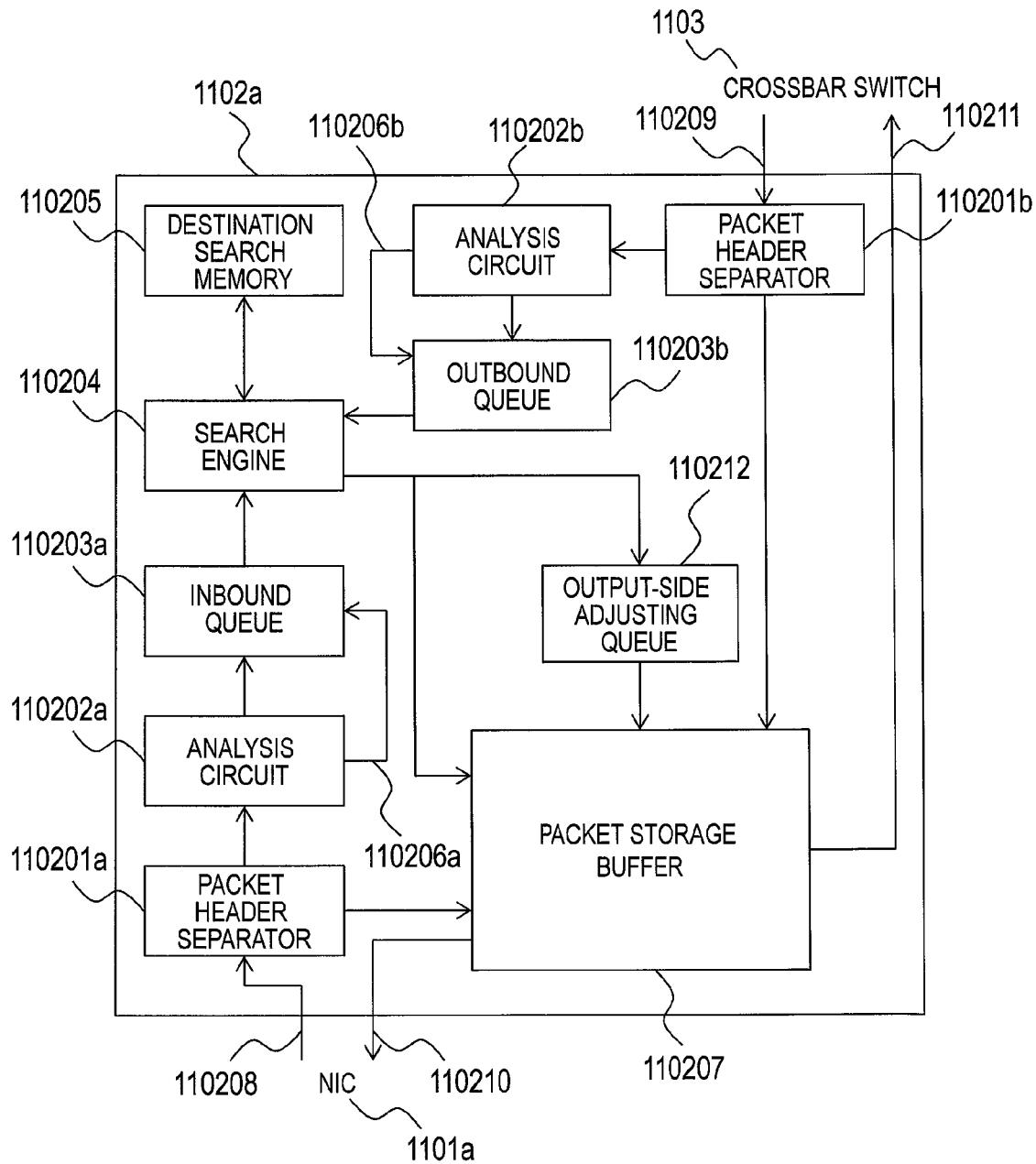
FIG. 12 is a block diagram illustrating a configuration of a search unit according to the fourth embodiment of this invention.

FIG. 12 is a block diagram illustrating the configuration of the search unit 1102*a*. The other search units 1102*b* to 1102*d* have the same configuration.

The search unit 1102*a* includes packet header separators 110201*a* and 110201*b*, analysis circuits 110202*a* and 110202*b*, an inbound queue 110203*a*, an outbound queue 110203*b*, a search engine 110204, a destination search memory 110205, a packet storage buffer 110207, and an output-side adjusting queue 110212. The search unit 1102*a* is provided with position designation paths 110206*a* and 110206*b*, a path 110208 for receiving a packet from the NIC 1101*a*, a path 110209 for receiving a packet from the crossbar switch 1103, a path 110210 for transmitting a packet to the NIC 1101*a*, and a path 110211 for transmitting a packet to the crossbar switch 1103.

When a packet is received through the path 110208 from the NIC 1101*a*, the packet header separator 110201*a* stores the body of the packet in the packet storage buffer 110207, and transmits the header portion of the packet and the address of the buffer 110207 where the packet is stored to the analysis circuit 110202*a*.

Through the processing to be described later, the analysis circuit 110202*a* analyzes whether the received packet is a jitter-reduction target packet, and transmits the packet to the inbound queue 110203*a* through a normal path or the position designation path 110206*a* in accordance with the result of the analysis. The inbound queue 110203*a* stores the packet, and transmits the stored packets to the search engine 110204 in order.

The search engine 110204 collates the header information with the information in the destination search memory 110205 to determine an output port based on the destination of the packet. The search engine 110204 transmits the result of the determination on the output port to the packet storage buffer 110207.

The packet storage buffer 110207 sends out the packet to the path 110211 directed to the crossbar switch 1103 or the path 110210 directed to the NIC 1101*a* in accordance with the transmitted destination information.

The packet that is transmitted via the crossbar switch 1103 (i.e., the outbound side) is processed in a manner similar to the processing of the packet to be transmitted on the inbound side. In other words, a packet on the outbound side is transmitted to the packet header separator 110201*b* through the path 110209, after which the body of the packet is stored in the packet storage buffer 110207, and the header portion of the packet and the address of the buffer 110207 where the packet is stored are transmitted to the analysis circuit 110202*b*. Then, the packet is transmitted to the search engine 110204 via the outbound queue 110203*b*. The search engine 110204 searches for an output destination port based on the destination of the packet, and transmits the result of the determination on the output port to the packet storage buffer 110207. The result of the outbound search is always sent out to the network via the NIC 1101*a*, and hence the result of the outbound search is transmitted to the NIC 1101*a* through the path 110210 from the packet storage buffer 110207.

Figure 13:
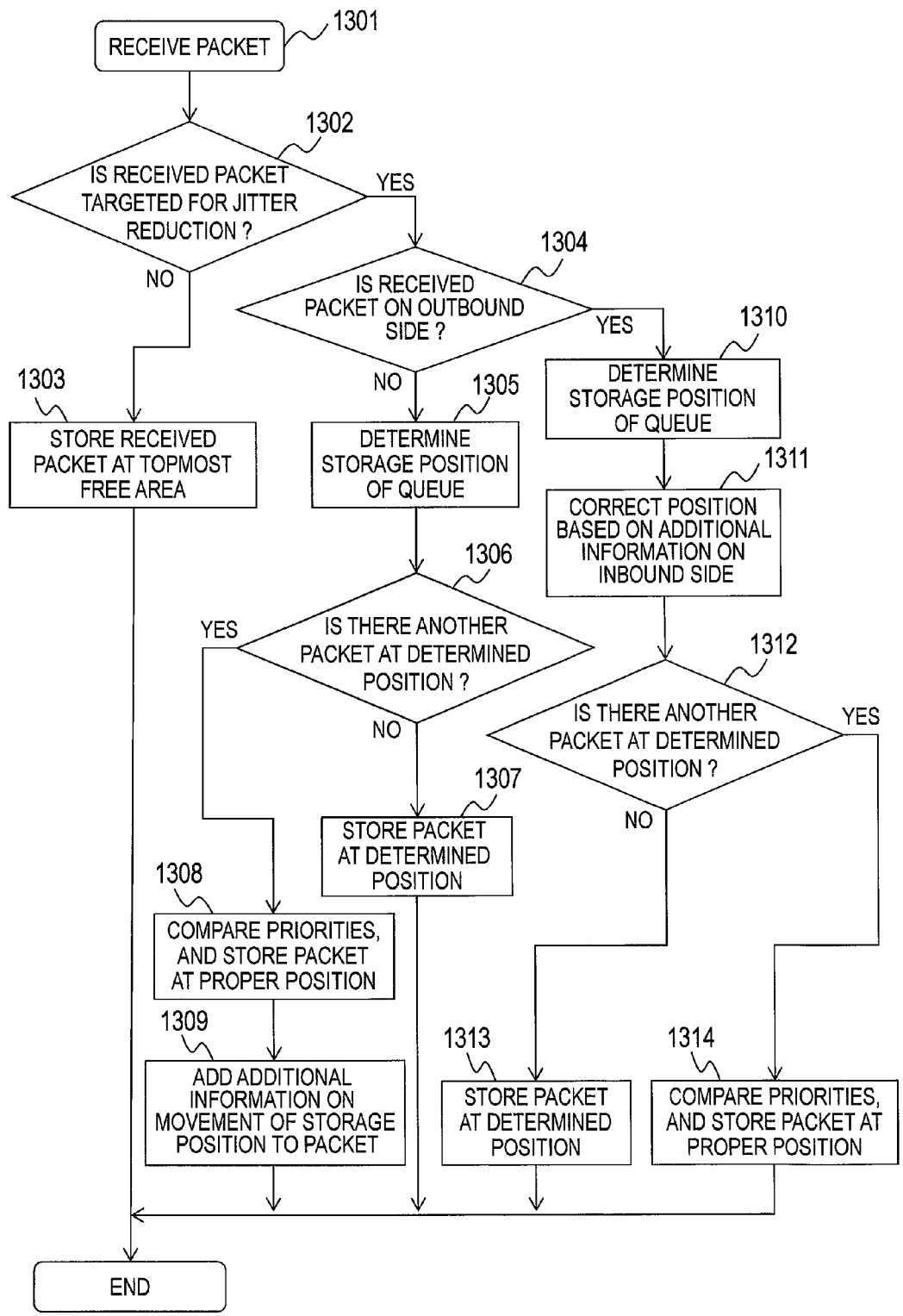
FIG. 13 is a flowchart of processing for discriminating the storage position of a packet according to the fourth embodiment of this invention.

FIG. 13 is a flowchart of the processing for discriminating the storage position of a packet according to the fourth embodiment. The discrimination processing illustrated in FIG. 13 is performed by the analysis circuit 110202 and the inbound queue 110203*a* or the outbound queue 110203*b*.

First, when a packet is received (1301), the network node 110 transmits the header information of the packet to the analysis circuit 110202. The analysis circuit 110202 searches the packet discrimination table by using at least one of the IP address, IP mask, VLAN ID, MAC address, TCP inbound port number, and TCP outbound port number included in the transmitted header information as a search condition, and discriminates whether the received packet is a jitter-reduction target packet (for example, time synchronous packet) (1302). The packet discrimination table in the fourth embodiment may be equivalent to the packet discrimination table shown in FIG. 10 of the above-mentioned third embodiment.

When the result of the discrimination shows that the received packet is not a jitter-reduction target packet, the header of the received packet is stored in the topmost free area in the queue (1303).

When the received packet is a jitter-reduction target packet, on the other hand, branching is carried out depending on whether the processing is on the inbound side or on the outbound side (1304).

In the processing on the inbound side, the analysis circuit 110202*a* acquires information on the insertion position into the queue and priority from the packet discrimination table (1305). Then, the analysis circuit 110202*a* transmits the jitter-reduction target packet together with the acquired information on the insertion position and priority to the inbound queue 110203*a* through the position designation path 110206*a*.

The inbound queue 110203*a* discriminates whether the header of another packet is stored at the insertion position of the jitter-reduction target packet (1306). As a result of the discrimination, when the header of the packet is not stored at the insertion position of the jitter-reduction target packet, the header of the packet, information (such as flag) indicating that the received packet is a jitter-reduction target packet, and information on the priority of the packet are stored at the insertion position (1307).

When the header of a packet is stored at the insertion position of the jitter-reduction target packet, on the other hand, the priority of the received packet is compared with the priority of the packet whose header is stored at the insertion position. When the priority of the received packet is lower, the packet stored at the insertion position is interchanged with the received packet, and shifting the insertion position of the jitter-reduction target packet backward by one position is repeated to determine the insertion position of the packet. Then, the header of the received packet is stored at the determined insertion position (1308).

Information on the amount of forward/backward shifting from the initially expected insertion position is given to the header of the jitter-reduction target packet to be inserted. When the packet that is shifted as a result of the insertion of the jitter-reduction target packet is a jitter-reduction target packet, information on the amount of forward/backward shifting from the initial storage position is given to the header of the shifted packet (1309).

In the processing on the outbound side, the analysis circuit 110202*b* acquires the information on the insertion position into the queue and the priority from the packet discrimination table (1310). Then, the storage position into the queue is adjusted based on the amount of shifting (amount of deviation) given on the inbound side. Specifically, the insertion position into the queue is adjusted forward/backward by the amount of shifting (amount of deviation) given to the packet. When the header of the packet that needs to be stored at the nth area on the inbound side is stored at the (n+1)th area, for example, the packet to which information indicating that the amount of shifting is +1 backward is transmitted to the outbound side. When the search result indicating that the packet needs to be stored in the mth area is obtained on the outbound side, the insertion position is corrected so that the packet is stored in the (m−1)th area, and the packet is transmitted to the queue 110203*b* (1311).

The outbound queue 110203*b*, similarly to the inbound queue 110203*a*, discriminates whether the header of another packet is stored at the insertion position of the header of the jitter-reduction target packet (1312). As a result of the discrimination, when the header of the packet is not stored at the insertion position of the jitter-reduction target packet, the header of the packet, the information (such as flag) indicating that the received packet is a jitter-reduction target packet, and the information on the priority of the packet are stored at the insertion position (1313).

When the header of a packet is stored at the insertion position of the jitter-reduction target packet, on the other hand, the priority of the received packet is compared with the priority of the packet whose header is stored at the insertion position. When the priority of the received packet is lower, the packet stored at the insertion position is interchanged with the received packet, and shifting the insertion position of the jitter-reduction target packet backward by one position is repeated to determine the insertion position of the packet. Then, the header of the received packet is stored at the determined insertion position (1314).

Although the network node according to the fourth embodiment uses the distributed architecture, various methods can be used for the internal processing. According to the fundamental configuration of the fourth embodiment, an output port is always searched on the inbound side, and an output port is searched on the outbound side via the crossbar switch 1103.

However, when one of the NICs directly connected to the search engine 110204 (search unit 1102a or the like) which has performed search, for example, the search may be completed upon the search result on the inbound side. Alternatively, search may also be performed on the outbound side but a packet may not be transmitted via the crossbar switch 1103. In this case, a path for transmitting a packet to the packet header separator 110201b from the packet storage buffer 110207 is needed.

When a path is shortened in the apparatus in accordance with the search result in this manner, the number of times of storage of packets in a queue changes, or the difference in delay time occurs due to the difference in the path through which a packet travels. When the paths in the apparatus are identical, a jitter is not generally affected. However, when it is necessary to set the absolute time by which a packet passes through the apparatus to be constant regardless of input ports and the apparatus configuration, the output-side adjusting queue 110212 is needed to correct the difference in passing time.

In this case, based on the result of the search performed by the search engine 110204, the output-side adjusting queue 110212 holds a packet header and adjusts the packet output timing so as to provide a wait time needed to compensate for the difference in the number of searches, the difference in path length in the apparatus, or the like.

According to the fourth embodiment, as described above, at the time a packet is stored in a queue, information on the amount of forward/backward shifting is given to the packet, which is then transferred within the network node, thereby correcting the storage position of the packet in a subsequent queue.

The fourth embodiment is an example of a distributed network node, and is preferably applied to a network node with a large number of ports and large storage capacity. In such a network node, storage into a queue may occur in every packet transmission between blocks. Accordingly, a network node may have a queue that is not described in this embodiment. When a network node has a large number of queues, it is very likely that packets cannot be stored at intended positions, thereby increasing jitters. The fourth embodiment can suppress an increase in jitter caused by the expansion of the scale of the apparatus.

While the present invention has been described in detail and pictorially in the accompanying drawings, the present invention is not limited to such detail but covers various obvious modifications and equivalent arrangements, which fall within the purview of the appended claims.

What is claimed is:

1. A network node for transferring a packet, comprising:
a plurality of ports to input and output a packet to be transferred;
a buffer memory to temporarily store the input packet;
a search engine to determine one of the ports from which the input packet is output; and
a timing adjusting unit to adjust a difference in a period of time needed from reception of a specific type of packet to transmission thereof,
wherein the buffer memory includes at least one queue in which the input packet is stored temporarily, and
wherein the timing adjusting unit is configured to:
determine whether the input packet is the specific type of packet, and store the determined specific type of packet at a predetermined position in the at least one queue, the specific type of packet being stored at the predetermined position even when a free area in which a packet is not stored exists ahead of the predetermined position at which the specific type of packet is to be stored, and
store a packet other than the specific type of packet in a top most free area in a case where the specific type of packet is at the end of the at least one queue and the free area exists in the at least one queue,
wherein the buffer memory is configured to shift stored packets forward one by one at every period of time for processing one packet in a case where an area in which a packet is stored exists behind the free area.

2. The network node according to claim 1, further comprising determination information indicating whether backward shifting of a storage position of a packet in the at least one queue is permitted,
wherein the timing adjusting unit stores the packet in the at least one queue so that the storage position of the packet whose backward shifting is not permitted is prevented from being shifted in a case where the determination information indicates non-permission of the backward shifting of the storage position of the specific type of packet and a packet is stored ahead of the specific type of packet in the at least one queue.

3. The network node according to claim 1, wherein in a case where a quantity of the specific type of packets stored in the at least one queue is larger than a predetermined number, one of the specific type of packets is discarded from the at least one queue, or a packet whose storage in the at least one queue is requested is prevented from being stored in the at least one queue.

4. The network node according to claim 1,
wherein the buffer memory includes a plurality of queues whose priorities are set; and
wherein the timing adjusting unit stores the specific type of packet at a predetermined position in one of the plurality of queues having a highest priority.

5. The network node according to claim 4, wherein the timing adjusting unit stores only the specific type of packet in the one of the plurality of queues having the highest priority.

6. The network node according to claim 1,
wherein the buffer memory includes an input-stage queue and an output-stage queue, and
wherein the timing adjusting unit is further configured to:
store an amount of shifting of the specific type of packet in a case where a storage position of the specific type of packet in the input-stage queue is shifted backward; and store the specific type of packet at a position located ahead of the predetermined position in the output-stage queue by the amount of shifting.

7. A method of controlling a packet that is transferred by a network node, the network node including a plurality of ports to input and output a packet to be transferred, a buffer memory to temporarily store the input packet; a search engine to determine one of the ports from which the input packet is output, and a timing adjusting unit to adjust an output timing for the input packet, the buffer memory including at least one queue in which the input packet is stored temporarily, the method including steps of:

determining whether the input packet is a specific type of packet;

controlling the output timing for the packet by storing the determined specific type of packet at a predetermined position in the at least one queue, where the specific type of packet is stored at the predetermined position even when a free area in which a packet is not stored exists ahead of a predetermined position at which the specific type of packet is to be stored;

shifting packets stored in the buffer memory forward one by one at every period of time for processing one packet in a case where an area in which a packet is stored exists behind the free area; and storing a packet other than the specific type of packet in a top most free area in a case where the specific type of packet is at the end of the at least one queue and the free area exists in the at least one queue.

* * * * *